United States Patent
Cho

(10) Patent No.: US 10,507,501 B2
(45) Date of Patent: Dec. 17, 2019

(54) METHOD OF MANUFACTURING PISTON OF PUMP FOR BRAKE SYSTEM AND PUMP FOR BRAKE SYSTEM INCLUDING THE PISTON

(71) Applicant: MANDO CORPORATION, Pyeongtaek-si, Gyeonggi-do (KR)

(72) Inventor: Joo-Un Cho, Suwon-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 290 days.

(21) Appl. No.: 15/600,936

(22) Filed: May 22, 2017

(65) Prior Publication Data

US 2017/0333963 A1  Nov. 23, 2017

(30) Foreign Application Priority Data

May 20, 2016  (KR) .................. 10-2016-0061930

(51) Int. Cl.
| | | |
|---|---|---|
| *F04B 19/02* | (2006.01) | |
| *B21B 17/08* | (2006.01) | |
| *B60T 8/40* | (2006.01) | |
| *B21B 17/02* | (2006.01) | |
| *F16J 10/00* | (2006.01) | |
| *B23P 11/00* | (2006.01) | |
| *B21D 28/28* | (2006.01) | |

(52) U.S. Cl.
CPC .............. *B21B 17/08* (2013.01); *B21B 17/02* (2013.01); *B60T 8/40* (2013.01); *B60T 8/4031* (2013.01); *F04B 1/0408* (2013.01); *B21D 28/28* (2013.01); *B23P 11/00* (2013.01); *F16J 10/00* (2013.01)

(58) Field of Classification Search
CPC ........... B21B 17/08; B21B 17/02; B21B 8/40; B21B 8/4031; B21B 1/0408; B21B 28/28; F16J 10/00; B23P 11/00
USPC ................. 417/460, 470; 72/199; 92/78
See application file for complete search history.

(56) References Cited

U.S. PATENT DOCUMENTS

| | | | | |
|---|---|---|---|---|
| 2,244,954 A | * | 6/1941 | Lenz ................. | B23P 15/10 29/888.04 |
| 2,667,390 A | * | 1/1954 | Watson ............... | B21K 1/18 29/888.04 |
| 3,808,676 A | * | 5/1974 | Schrock ............. | H02K 33/02 29/446 |
| 7,278,835 B2 | * | 10/2007 | Schmitt ............. | B60T 8/4031 138/26 |
| 8,572,843 B2 | * | 11/2013 | Heraldo ............. | B21K 1/18 29/888.04 |

(Continued)

FOREIGN PATENT DOCUMENTS

| | | |
|---|---|---|
| CN | 1508432 A | 6/2004 |
| CN | 101424263 A | 5/2009 |

(Continued)

OTHER PUBLICATIONS

Ohinese Office Action dated Sep. 29, 2018, in connection with the Chinese Patent Application No. 201710364730.3.

*Primary Examiner* — David B Jones
(74) *Attorney, Agent, or Firm* — Hauptman Ham, LLP

(57) ABSTRACT

According to the embodiment of the present disclosure, it provides a method of manufacturing a piston of a pump for brake system, the piston fabricated using a piercing process by press forming to have an inlet path communicating with a suction port through which oil is introduced.

5 Claims, 3 Drawing Sheets

(56) References Cited

U.S. PATENT DOCUMENTS

2004/0130206 A1    7/2004  Yang
2008/0314239 A1*  12/2008  Leidecker ............... B23P 15/10
                                                      92/169.1
2009/0110571 A1    4/2009  Kim
2014/0314600 A1*  10/2014  Ding ................... B05B 11/3023
                                                      417/437

FOREIGN PATENT DOCUMENTS

CN          201423409 Y      3/2010
KR         10-0538512 B1    12/2005
KR      10-2011-0124602 A    11/2011

* cited by examiner

METHOD OF MANUFACTURING PISTON OF PUMP FOR BRAKE SYSTEM AND PUMP FOR BRAKE SYSTEM INCLUDING THE PISTON

CROSS-REFERENCE TO RELATED APPLICATION(S)

This application claims the benefit of Korean Patent Application No. 2016-0061930, filed on May 20, 2016 in the Korean Intellectual Property Office, the disclosure of which is incorporated herein by reference.

BACKGROUND

1. Field

Embodiments of the present disclosure relate to a method of manufacturing a piston of a pump for brake system and a pump for brake system including the piston manufactured using the method, and more particularly, to a method of manufacturing a piston of a pump for brake system to achieve a reduction in manufacturing costs and improvement of productivity and a pump for brake system including the piston manufactured using the method.

2. Description of the Related Art

In general, an anti-lock braking system (ABS), electric stability control (ESC), electro-hydraulic brake (EMB), or the like is installed at a brake system of a vehicle. The brake system controls a braking hydraulic pressure of the vehicle to acquire driving stability of the vehicle.

The brake system is equipped with a pump to control a hydraulic pressure transmitted to wheel cylinders of the brake.

Such a brake system includes a plurality of solenoid valves, low-pressure and high-pressure accumulators to temporarily store oil discharged from a hydraulic brake, a motor and a pump to pump the oil temporarily stored in the low-pressure accumulator, and an electronic control unit (ECU) to control the operation of the solenoid valves and the motor. All of these elements are installed in a modulator block made of aluminum.

Among these elements, examples of the pump that controls the hydraulic pressure transmitted to wheel cylinders of the brake are disclosed in Korean Patent No. 10-0538512 and Korean Patent Application Publication No, 20-2011-0124602. Referring to these documents, a pump includes a piston configured to receive oil through a suction port and press the oil contained in a pressure chamber while moving forward and backward by an eccentric spindle of a motor and a piston spring configured to reciprocating the piston together with the eccentric spindle by pushing the piston toward to the eccentric spindle of the motor. The pump transmits oil toward a wheel cylinder or master cylinder of the brake by forcedly pumping oil from the low-pressure accumulator or the master cylinder to the high-pressure accumulator. In this case, the piston is generally manufactured by a forging process and has an inlet path formed by a cutting process to communicate with a suction port.

However, the method of forming the inlet path by the cutting process in the piston fabricated by the forging process may increase manufacturing costs and decrease production efficiency due to a long processing time.

RELATED ART

Patent Documents

Patent Document 1: Korean Patent No. 10-0538512, (Hyundai Mobis Co., Ltd., Registered on Dec. 16, 2005)

Patent Document 2: Korean Patent Application Publication No. 2011-0124602, Detailed Descriptions and FIG. 3)

SUMMARY

Therefore, it is an aspect of the present disclosure to provide a method of manufacturing a piston of a pump for brake system and a pump for brake system including the piston manufactured using the method which reduce manufacturing costs and increase productivity by refining a structure and manufacturing process of the piston.

Additional aspects of the disclosure will be set forth in part in the description which follows and, in part, will be obvious from the description, or may be learned by practice of the disclosure.

According to the embodiment of the present disclosure, it provides a method of manufacturing a piston of a pump for brake system, the piston fabricated using a piercing process by press forming to have an inlet path communicating with a suction port through which oil is introduced.

Also, according to the embodiment of the present disclosure, the piston has a hollow cylindrical shape with one open side.

According to the embodiment of the present disclosure, it provides the pump for brake system comprising: a piston disposed in a bore formed in a modulator block comprising a suction port and a discharge port, configured to move in a reciprocating manner, and having a hollow shape in which an inlet path communicating with the suction port is formed; an inlet valve provided in the piston; a seat member installed in the piston to support the inlet valve and having a communication hole opened or closed by the inlet valve; a valve seat installed in the bore to partially surround the piston at a predetermined distance from the piston, configured to define the inlet path as a pressure chamber to press oil, and provided with an orifice; a piston spring disposed in the pressure chamber and configured to press the piston; an outlet valve configured to open or close the orifice; and a cap installed at the valve seat to support the outlet valve, fixed to the modulator block to open or close an open end of the bore, and configured to form a discharge chamber connected to the discharge port.

Also, according to the embodiment of the present disclosure, the piston is fabricated in a cylindrical shape with one open side by press forming.

Also, according to the embodiment of the present disclosure, the piston has a stepped portion to support the seat member.

Also, according to the embodiment of the present disclosure, the pump for brake system further comprises a filter member disposed at the outer surface of the piston in the bore and configured to filter oil introduced into the bore through the suction port.

Also, according to the embodiment of the present disclosure, the inlet path of the piston is divided into the pressure chamber and a reservoir to store oil by the seat member.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
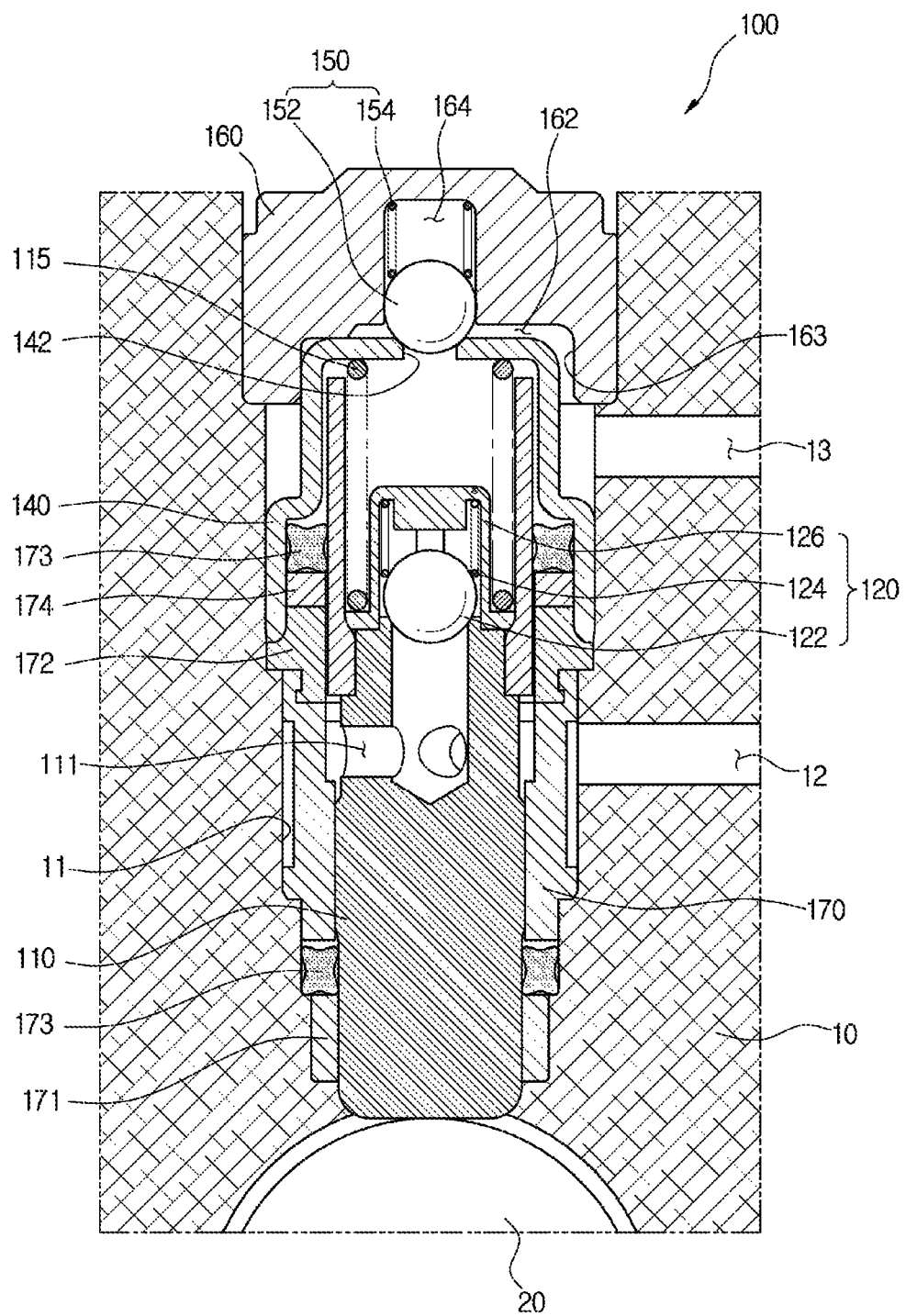
FIG. 1 is a cross-sectional view illustrating a pump for brake system including the piston according to an embodiment.

Reference will now be made in detail to the embodiments of the present disclosure, examples of which are illustrated in the accompanying drawings, wherein like reference numerals refer to like elements throughout. The present disclosure may, however, be embodied in many different forms and should not be construed as being limited to the embodiments set forth herein; rather, these embodiments are provided so that this disclosure will be thorough and complete, and will fully convey the concept of the disclosure to those of ordinary skill in the art. The drawings may be exaggerated, omitted, or schematically illustrated for convenience of description and clarity.

As illustrated in FIG. 1, a pump for brake system according to an embodiment includes a piston 110 installed in a bore 11 formed in a modulator block 10, configured to move in a reciprocating manner, and having an inlet path 112, an inlet valve 120 disposed at an outlet of the inlet path 112 of the piston 110 to open or close the outlet of the inlet path 112, a valve seat 140 installed in the bore 11, configured to divide the bore 11 into a pressure chamber 112b and a discharge chamber 162, an outlet valve installed in the discharge chamber 162 to open or close an orifice 142 disposed at the valve seat 140 to connect the pressure chamber 112b with the discharge chamber 162, and a cap 160 configured to support the outlet valve 150.

Referring to FIG. 1, the bore 11 of the modulator block 10 is divided into a suction port 12 communicating with the inlet path 112, the pressure chamber 112b disposed downstream of the inlet path 112 and including oil pressed in accordance with the operation of the piston 110, and the discharge chamber 162 disposed downstream of the pressure chamber 112b and communicating with a discharge port 13. The discharge chamber 162 is sealed by the cap 160 coupled to the modulator block 10. That is, one open end of the modulator block 10 is closed by the cap 160.

The piston 110 reciprocates by an eccentric member 20 installed at a motor (not shown), and a sealing member 129 for sealing the piston 110 is provided between the eccentric member 20 and the suction port 12 and between the piston 110 and the valve seat 140. In this regard, the inlet path 112 expands at a downstream side thereof at one end of the piston 110 and has a stepped portion such that the pressure chamber 112b is formed in the expanded portion. Here, the inlet path 112 formed in the piston 110 connect the suction port 12 (with the pressure chamber 112b. The inlet path 112 is opened or closed by the inlet valve 120 installed in the piston 110.

The inlet valve 120 includes a shielding member to close the inlet path 112 in contact with a downstream end of the inlet path 112 in the piston 110, a valve spring elastically supporting the shielding member, and a retainer coupled to the downstream end of the inlet path 112 to support the shielding member and the valve spring.

The shielding member closes the inlet path 112 by an elastic force of the valve spring. When a pressure of the pressure chamber 112b decreases due to discharge of oil from the pressure chamber 112b, the shielding member is separated from the inlet path 112 due to a pressure difference between the inlet path 112 and the pressure chamber 112b to open the inlet path 112.

The valve seat 140 is installed in the bore 11 and divides the bore 11 into the pressure chamber 112b in which the piston 110 is disposed and the discharge chamber 162 connected to the discharge port 13. An orifice 142 is provided at a downstream end of the valve seat 140 to connect the pressure chamber 112b with the discharge chamber 162. The orifice 142 is opened or closed by the outlet valve 150 disposed at the discharge chamber 162.

In addition, the valve seat 140 is installed in the modulator block 10 to surround the piston 110 thereby supporting the piston spring 114 that elastically supports the piston 110 as illustrated in FIG. 1. The piston spring 115 allows reciprocation of the piston 110 simultaneously with the eccentric member 20 by pressing the piston 110 toward the eccentric member 20.

The outlet valve 150 includes an opening/closing member 152 to close the orifice 142 and a valve spring 154 to elastically support the opening/closing member 152. The opening/closing member 152 closes the orifice 142 by an elastic force of the valve spring 154. When oil of the pressure chamber 112b is pressed by the piston 110, the opening/closing member 152 is pushed by the pressure of the oil to be separated from the valve seat 140, thereby opening the orifice 142. In this regard, the valve spring 154 is a coil spring having one end supported by the cap 160 to be described later and the other end supported by the opening/closing member 152, thereby providing an elastic force to the opening/closing member 152. That is, the opening/closing member 152 that has moved by the discharge of the oil returns to an original position thereof by an elastic force of the valve spring 154 to close the orifice 142.

Meanwhile, a filter member 170 may be installed in the bore 11 to surround the outer surface of the piston 110 to filter oil introduced into the bore 11 through the suction port 12.

The above-mentioned pump for brake system pumps oil toward a high-pressure accumulator (not shown) by pressing the oil via linear reciprocation of the piston 110 in accordance with eccentric rotation of the eccentric member 20 of the motor (not shown) and opening or closing of the inlet valve 120 and the outlet valve 150 in opposite ways in accordance with a pressure difference in the bore 11

That is, when the piston 110 moves toward the outlet valve 150, oil contained in the pressure chamber 112b is pressed by the piston 110 resulting in an increase in the pressure of oil. Thus, the inlet valve 120 is closed and the outlet valve 150 is opened so that the oil is discharged toward the discharge chamber 162 through the orifice 142, i.e., oil flows through a flow path of the cap 160 and is discharged to the discharge port 13 to be pumped toward the high-pressure accumulator.

On the contrary, when the piston 110 moves toward the eccentric member 20, the pressure of the pressure chamber 112b decreases to open the inlet valve 120 and close the outlet valve 150. Thus, oil of a low-pressure accumulator (not shown) or a master cylinder (not shown) is sucked into the pressure chamber 112b disposed between the piston 110 and the outlet valve 150 via the suction port 12 and the inlet path 112. That is, this operation is repeated.

Figure 2:
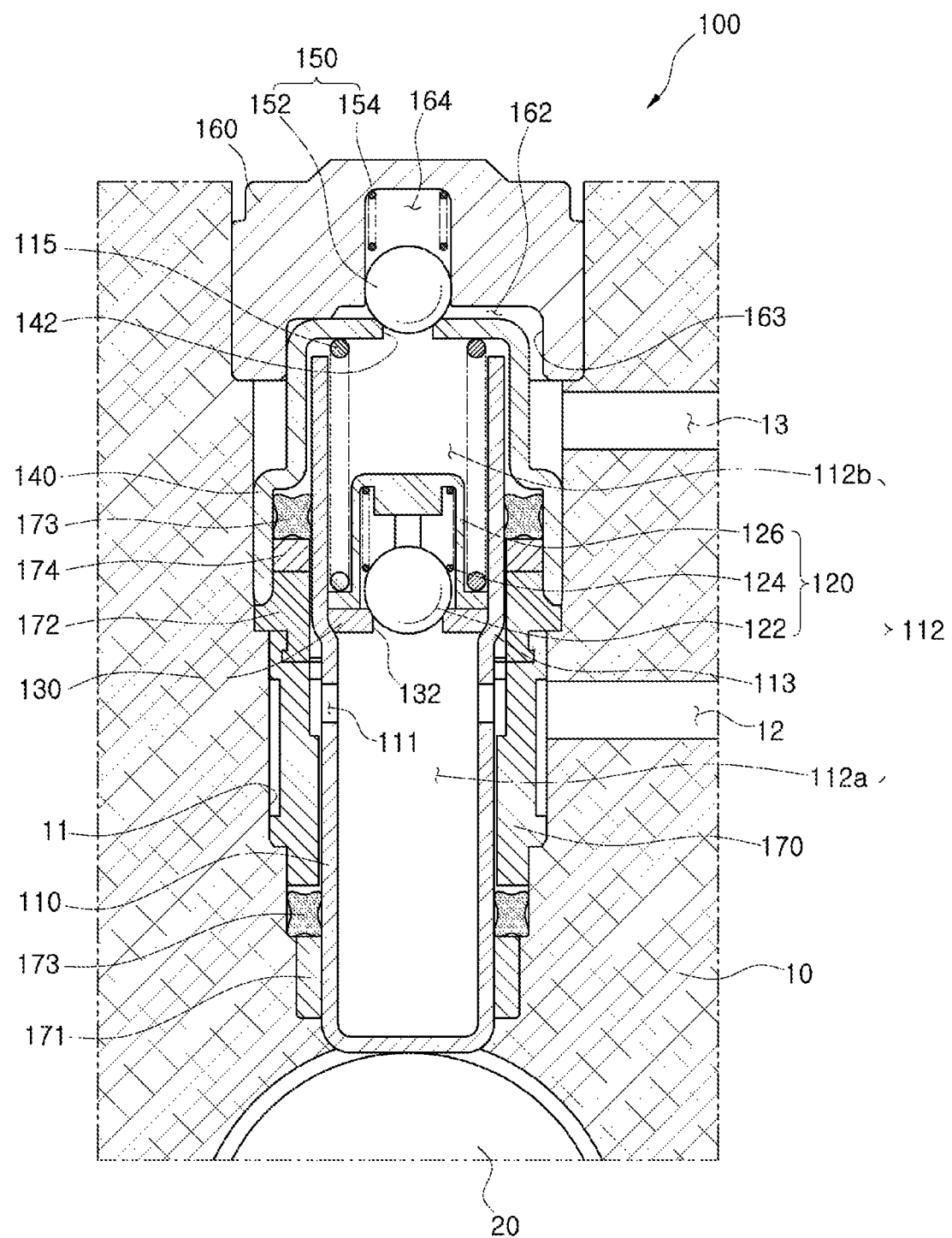
FIG. 2 is a cross-sectional view illustrating a pump for brake system including the piston according to an embodiment.

As illustrated in FIG. 2, in a pump for brake system according to another embodiment, an inlet path 112 and a suction port 12 are simultaneously formed by a piercing process to allow suction of oil via the inlet path 112 as a suction hole formed on the outer circumference of the piston 110. A pump 100 for brake system including the piston 110 is illustrated in FIG. 2.

Referring to FIG. 2, the pump 100 for brake system includes the piston 110 installed in a bore 11 formed in a modulator block 10, configured to move in a reciprocating manner, and having an inlet path 112 therein, an inlet valve 120 disposed in the inlet path 112 of the piston 110, a seat member 130 configured to support the inlet valve 120 and having a communication hole 132 opened or closed by the inlet valve 120, a valve seat 140 installed in the bore 11, configured to define the inlet path 112 as a pressure chamber 112b to press oil, and having an orifice 142, a piston spring 115 disposed in the pressure chamber 112b and configured to press the piston 110, an outlet valve 150 configured to open or close the orifice 142, and a cap 160 coupled to the valve seat 140 to support the outlet valve 140 and configured to define a discharge chamber 162.

In the modulator block 10, the bore 11 in which the pump 100 for brake system is installed, the suction port 12 connected to the bore 11 to communicate with the inlet path 112, and the discharge port 13 connected to the bore 11 to communicate with a discharge path 163 formed in the cap 160 are formed. In this regard, the bore 11 is divided into the pressure chamber 112b disposed downstream of the inlet path 112 to be pressed in accordance with the operation of the piston 110 and the discharge chamber 162 disposed downstream of the pressure chamber 112b to communicate with the discharge port 13. That is, an opening of the bore 11 that is one open end of the modulator block 10 is closed by the cap 160.

The piston 110 is installed in the bore 11 to move in a reciprocating manner and has a hollow cylindrical shape with one open side. That is, the inlet path 112 is formed in the piston 110 to communicate with the suction port 12 through which oil is supplied. In this case, the inlet path 112 communicates with the suction port 12 via a suction hole 111 formed on an outer circumference of the piston 110. The piston 110 is disposed in contact with an outer surface of an eccentric member 20 installed at the rotary shaft (not shown) of the motor (not shown). Thus, as the eccentric member 20 rotates eccentrically, the piston 110 reciprocates and the inlet path 112 formed in the piston 110 is opened or closed by the inlet valve 120 installed in the inlet path 112.

More particularly, a stepped portion 113 is formed in the piston 110 such that a diameter thereof decreases. The seat member 130 which will be described later is installed to be supported by the stepped portion 113. In this regard, the inlet path 112 of the piston 110 may be divided into a reservoir 112a to store oil introduced through the suction hole 111 and the pressure chamber 112b disposed at an upper portion than the reservoir 112a by the seat member 130. That is, while a conventional inlet path simply serves as a path of oil introduced through a suction port, the inlet path 112 of the piston 110 according to an embodiment is divided into the reservoir 112a to store more oil than the conventional inlet path and the pressure chamber 112b in which oil introduced thereinto through the inlet valve 120 is pressed. Thus, the reservoir 112a into which oil is introduced through the suction port 12 is disposed at an upstream side of the inlet path 112. The inlet path 112 expands by the stepped portion 113 at a downstream side, and the pressure chamber 112b is disposed at the expanded portion.

The inlet valve 120 is installed in the inlet path 112 of the piston 110 and controls a flow of oil flowing through the inlet path 112. The inlet valve 120 is supported by the seat member 130 coupled to the stepped portion 113 to open or close a communication hole 132 formed in the seat member 130. The inlet valve 120 includes an opening/closing member 122 to close the communication hole 132, a valve spring 124 elastically supporting the opening/closing member 122, and a retainer 126 installed in the piston 110 to support the opening/closing member 122 and the valve spring 124.

The opening/closing member 122 closes the communication hole 132 by an elastic force of the valve spring 124. When a pressure of the pressure chamber 112b decreases due to discharge of oil from the pressure chamber 112b, the opening/closing member 112 is separated from the communication hole 132 due to a pressure difference between the reservoir 112a and the pressure chamber 112b of the inlet path 112, thereby open the inlet path 112.

The seat member 130 is installed in the inlet path 112 and provided with the communication hole 132 opened or closed by the inlet valve 120. Although the seat member 130 is disposed in the inlet path 112 to open or close the inlet path 112 by the inlet valve 120, the present disclosure is not limited thereto. The pump may be configured without using the seat member 130 so long as the retainer 126 of the inlet valve 120 is supported by the stepped portion 113 and the opening/closing member 122 opens or closes the stepped portion 113.

The valve seat 140 is installed in the bore 11 to partially surround the piston 110 at a predetermined distance from the piston 110 and coupled to the cap 160 to be fixed to the modulator block 10. The inlet path 112 is defined by the valve seat 140 as the pressure chamber 112b to press oil. That is, the valve seat 140 divides the bore 11 into the pressure chamber 112b in which the piston 110 is disposed and the discharge chamber 162 configured to communicate with the discharge port 13. In addition, the valve seat 140 has an orifice 142 to connect the pressure chamber 112b with the discharge chamber 162. The orifice 142 is opened or closed by the outlet valve 150 provided at the discharge chamber 162.

Also, the valve seat 140 supports the piston spring 115 disposed in the pressure chamber 112b and elastically supporting the piston 110 as illustrated herein. Thus, the piston spring 115 is configured to allow reciprocation of the piston 110 simultaneously with the eccentric member 20 by pressing the piston 110 toward the eccentric member 20.

The outlet valve 150 includes an opening/closing member 152 to close the orifice 142 and a valve spring 154 configured to elastically support the opening/closing member 152. The opening/closing member 152 closes the orifice 142 by an elastic force of the valve spring 154. When oil of the pressure chamber 112b is pressed by the piston 110, the opening/closing member 152 is pushed by the pressure of the oil to be separated from the valve seat 140, thereby opening the orifice 142. In this regard, the valve spring 154 is a coil spring having one end inserted into a spring accommodation groove 164 formed in the cap 160 and supported thereby and the other end supported by the opening/closing member 152, thereby providing an elastic force to the opening/closing member 152. That is, the opening/closing member 152 that has moved by the discharge of the oil returns to an original position thereof by an elastic force of the valve spring 154 to close the orifice 142.

In the cap 160, the discharge path 163 and the discharge chamber 162 are formed to communicate with the discharge port 13 such that oil contained in the pressure chamber 112b is discharged through the discharge port 13. In this regard, the discharge chamber 162 is separated from the pressure chamber 112b by the afore-mentioned valve seat 140. The cap 160 closes the opening of the bore 11 in a state of being coupled to the valve seat 140.

According to an embodiment, a filter member 170 may be installed in the bore 11 to surround the outer surface of the piston 110 to filter oil introduced into the bore 11 through the suction port 12. In this case, the filter member 170 is engaged with a stopper member 172 inserted into the valve seat 140 for stable coupling. The stopper member 172 supports a sealing member 173 and a backup-ring 174 supporting the sealing member 173 which are disposed between the valve seat 140 and the piston 110 and couples the valve seat 140 to the filter member 170.

Meanwhile, a sealing member 173 is provided between the eccentric member 20 and the suction port 12 in contact with the piston 110 and the bore 11 to block an inflow of oil into the eccentric member 20.

In addition, a guide ring 171 is installed in the bore 11 and guides stable reciprocation of the piston 110.

The pump 100 for brake system pumps oil toward the discharge path 163 by opening and closing the inlet valve 120 and the outlet valve 150 in opposite ways in accordance with a pressure difference in the bore 11 via linear reciprocation of the piston 110 in accordance with eccentric rotation of the eccentric member 20 of the motor (not shown).

That is, when the piston 110 moves toward the outlet valve 150, oil contained in the pressure chamber 112b is pressed by the piston 110 resulting in an increase in a pressure of oil. Thus, the inlet valve 120 is closed and the outlet valve 150 is opened so that the oil is discharged toward the discharge chamber 162 through the orifice 142, i.e., discharged out of the discharge port 13 through the discharge path 163 of the cap 160.

On the contrary, when the piston 110 moves toward the eccentric member 20, the pressure of the pressure chamber 112b decreases to open the inlet valve 120 and close the outlet valve 150. Thus, oil of a low-pressure accumulator (not shown) or a master cylinder (not shown) is sucked into the pressure chamber 112b disposed between the inlet valve 120 and the outlet valve 150 via the suction port 12 and the reservoir 112a of the inlet path 112. That is, this operation is repeated.

Figure 3:
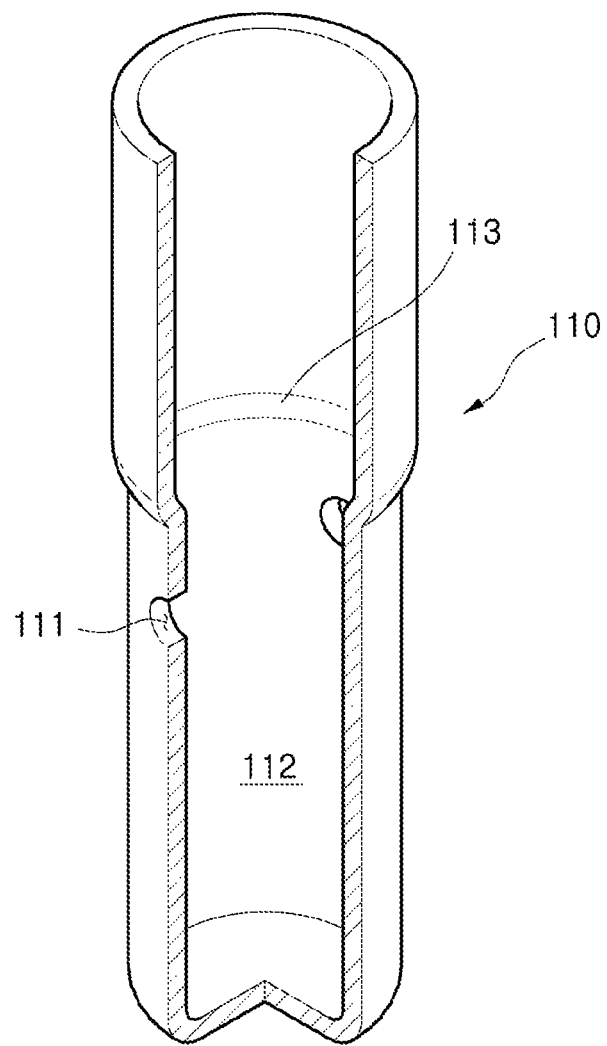
FIG. 3 is a perspective view illustrating a piston manufactured according to a method of manufacturing a piston of a pump for brake system according to an embodiment.

FIG. 3 is a perspective view illustrating a piston manufactured according to a method of manufacturing a piston of a pump for brake system according to an embodiment.

A piston 110 according to an embodiment is fabricated by press forming. More particularly, the piston 110 presses oil while reciprocating by eccentric rotation of an eccentric member 20 (FIG. 2) installed at a rotary shaft of a motor. Thus, an inlet path 112 is formed in the piston 110 to communicate with a suction port 12 (FIG. 2) through which oil is introduced.

The inlet path 112 is formed through a lengthwise direction of the piston. In this regard, the inlet path 112 is formed using a piercing process by press forming. That is, the inlet path 112 is formed simultaneously with the piston 110 fabricated by press forming. Thus, the piston 110 may be more easily manufactured than conventional pistons which have been manufactured in a complicated manner using a conventional forging process. In addition, since the inlet path 112 is manufactured simultaneously with fabrication of the piston 110 using the piercing process by press forming, workability may be improved, productivity may increase, and manufacturing costs may decrease in comparison with conventional methods.

Meanwhile, referring to FIG. 3, a suction hole 111 is formed simultaneously with the inlet path 112 by the piercing process around the piston 110 to allow oil to flow into the inlet path 112.

As a result, manufacturing costs for the piston 110 according to an embodiment may be reduced by fabricating the piston 110 by press forming and the pump may be easily assembled by using the piston 110.

As is apparent from the above description, according to the method of manufacturing a piston of a pump for brake system and a pump for brake system including the piston manufactured thereby, manufacturing costs may be reduced and productivity may be increased via simplification of the configuration of the piston and manufacturing process therefor by forming the piston by press forming.

In addition, since the piston is formed by press forming and the inlet path may be formed by a piercing process simultaneously, the inlet path may be formed without performing an additional process. Thus, assembling efficiency of the pump may be improved.

Also, the number of parts of the piston may be reduced by fabricating the piston as a single piece in comparison with conventional pistons formed of two parts.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A pump for brake system comprising:
   a piston disposed in a bore formed in a modulator block comprising a suction port and a discharge port, and having a hollow shape in which an inlet path communicating with the suction port is formed, wherein the piston is slidably disposed to be moved in a reciprocating manner within the bore;
   an inlet valve provided in the piston;
   a seat member provided in the piston, attached to the inlet valve, and having a communication hole opened or closed by the inlet valve;
   a valve seat provided in the bore, partially surrounded the piston at a predetermined distance from the piston to form the inlet path as a pressure chamber to press oil, and provided with an orifice;
   a piston spring disposed in the pressure chamber to press the piston;
   an outlet valve provided on the valve seat to open or close the orifice; and
   a cap coupled to the valve seat to support the outlet valve, fixed to the modulator block to open or close an open end of the bore, and forming, by coupling with the valve seat, a discharge chamber connected to the discharge port.

2. The pump for brake system according to claim 1, wherein the piston is fabricated in a cylindrical shape with one open side by press forming.

3. The pump for brake system according to claim 1, wherein the piston has a stepped portion to support the seat member.

4. The pump for brake system according to claim 1, further comprising a filter member disposed at an outer surface of the piston in the bore and configured to filter oil introduced into the bore through the suction port.

5. The pump for brake system according to claim 1, wherein the inlet path of the piston is divided into the pressure chamber and a reservoir to store oil by the seat member.

* * * * *